United States Patent
Bernsen

(10) Patent No.: US 9,948,455 B2
(45) Date of Patent: Apr. 17, 2018

(54) MANAGEMENT OF GROUP SECRETS BY GROUP MEMBERS

(75) Inventor: Johannes Arnoldus Cornelis Bernsen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/344,684

(22) PCT Filed: Sep. 14, 2012

(86) PCT No.: PCT/IB2012/054797
§ 371 (c)(1),
(2), (4) Date: Mar. 13, 2014

(87) PCT Pub. No.: WO2013/042022
PCT Pub. Date: Mar. 28, 2013

(65) Prior Publication Data
US 2014/0380049 A1 Dec. 25, 2014

Related U.S. Application Data

(60) Provisional application No. 61/536,761, filed on Sep. 20, 2011.

(51) Int. Cl.
*H04L 29/06* (2006.01)
*H04L 9/08* (2006.01)
*H04L 12/24* (2006.01)

(52) U.S. Cl.
CPC .......... *H04L 9/0816* (2013.01); *H04L 9/0838* (2013.01); *H04L 41/12* (2013.01); *H04L 63/065* (2013.01); *H04L 2209/24* (2013.01)

(58) Field of Classification Search
CPC .................. H04L 9/0833; H04L 63/065
See application file for complete search history.

(56) References Cited

U.S. PATENT DOCUMENTS

| | | | |
|---|---|---|---|
| 2005/0111668 A1* | 5/2005 | Raikar ............ | H04L 9/0833 380/278 |
| 2006/0129805 A1* | 6/2006 | Kim .............. | H04L 9/0822 713/158 |

(Continued)

FOREIGN PATENT DOCUMENTS

| | | |
|---|---|---|
| CN | 1777095 A | 5/2006 |
| CN | 101588235 A | 11/2009 |

(Continued)

OTHER PUBLICATIONS

Camtepe, Seyit A., and Bulent Yener. "Key distribution mechanisms for wireless sensor networks: a survey." Rensselaer Polytechnic Institute, Troy, New York, Technical Report (2005): 05-07.*

(Continued)

*Primary Examiner* — Samson Lemma
*Assistant Examiner* — Michael Guirguis
(74) *Attorney, Agent, or Firm* — Larry Liberchuk

(57) ABSTRACT

A method of adding a new device (221) to a device group (210), the device group (210, 220) including a plurality of devices, wherein each device in the device group possesses a device group key and device keys of all other devices in the device group for encryption of messages, except its own device key. The method includes: establishing a secure connection between the new device (221) and a first device (211) in the device group (210); sending, by the first device (211) in the device group (210), the device group key and device keys of all other devices (212, 213, . . . , 21N) in the device group (210) to the new device (221); distributing, by one of the other devices (212, 213, . . . , 21N) in the device group (210), the device key of the first device (211) in the device group (210) to the new device (221); generating and distributing, by one of the devices (211, 212, 213, . . . , 21N) in the device group (210), a device key of the new device (221) to all other devices (211, 212, 213, . . . , 21N) in the (Continued)

100

| Device 1 | Device 2 | ... | Device N |
|---|---|---|---|
| Device group key | Device group key | ... | Device group key |
| Device key 2 | Device key 1 | ... | Device key 1 |
| Device key 3 | Device key 3 | ... | Device key 2 |
| ... | ... | ... | ... |
| Device key N | Device key N | ... | Device key N-1 | device group (210). This approach is also generalized to k-resilient schemes.

13 Claims, 4 Drawing Sheets

(56) References Cited

U.S. PATENT DOCUMENTS

| | | |
|---|---|---|
| 2007/0172067 A1 | 7/2007 | Otal |
| 2007/0201690 A1 | 8/2007 | Kim |
| 2008/0019528 A1 | 1/2008 | Kneissler |
| 2009/0060189 A1* | 3/2009 | Osajima ............... H04L 9/0833 380/259 |
| 2011/0194698 A1 | 8/2011 | Asano |
| 2012/0257756 A1* | 10/2012 | Huang ................. H04L 9/0836 380/281 |

FOREIGN PATENT DOCUMENTS

| | | |
|---|---|---|
| JP | 2002300149 A * | 10/2002 |
| WO | WO2005008949 A1 | 1/2005 |
| WO | WO2006052111 A1 | 5/2006 |

OTHER PUBLICATIONS

Liu, Donggang, Peng Ning, and Kun Sun. "Efficient self-healing group key distribution with revocation capability." Proceedings of the 10th ACM conference on Computer and communications security. ACM, 2003.*

Amos Fiat et al: "Broadcast Encryption", Advances in Cryptology (Crypto). Santa Barbara, Aug. 22-26, 1993; [Proceedings of the Annual Intl Cryptology Conference (Crypto)], Berlin, Springer, DE, pp. 480-491, XP019194081.

Kenthapadi K. et al., "Broadcast Encryption", Nov. 11, 2003 http://infolab.stanford.edu/~dilys/dbprivacy/krishnaram/broadcast_encryption.pdf.

Daisuke Inoue et al: "FDLKH: Fully Decentralized Key Management Scheme on Logical Key Hierarchy", May 15, 2004 (May 15, 2004), Applied Cryptography and Network Security; [Lecture Notes in Computer Science;;LNCS], Springer-Verlag, Berlin/Heidelberg, pp. 339-354, XP019008006.

Ju-Hyung Son et al: "Topological Key Hierarchy for Energy-Efficient Group Key Management in Wireless Sensor Networks", Wireless Personal Communications, Kluwer Academic Publishers, DO, vol. 52, No. 2, Jan. 1, 2009 (Jan. 1, 2009), pp. 359-382, XP019775630.

* cited by examiner

| Device 1 | Device 2 | ... | Device N |
|---|---|---|---|
| Device group key | Device group key | ... | Device group key |
| Device key 2 | Device key 1 | ... | Device key 1 |
| Device key 3 | Device key 3 | ... | Device key 2 |
| ... | ... | ... | ... |
| Device key N | Device key N | ... | Device key N-1 |

MANAGEMENT OF GROUP SECRETS BY GROUP MEMBERS

This invention relates to the management of group secrets and, more particularly, to a method and a system for group members to manage group secrets.

Certain embodiments herein are directed to key management of a group of devices including starting a group, expanding group membership and reducing group membership, without the need for a central authority to manage and distribute keys to the group members. Certain embodiments further allow a device of the group of devices to send secure messages to any sub-group of devices among the group members, such that non-addressed devices cannot decrypt the message.

Known message encryption schemes may be based on, for example, 'Zero Message Broadcasting' (ZMB) or Broadcast Encryption'; see, e.g., Amos Fiat and Moni Naor, *Broadcast Encryption,* 1993 (hereinafter Fiat & Naor). Fiat & Naor discuss Broadcast Encryption. In general the term 'broadcast encryption' can simply mean encryption of broadcasts. However, as introduced by Fiat & Naor the term takes on a specific meaning Fiat & Naor's 'broadcast encryption' was developed for enabling a broadcaster to securely broadcast a message to a subset of a pre-defined group of devices. The pre-defined group is called the Device Group.

The central idea in the simplest variant of Fiat & Naor's Broadcast Encryption is that each device in a Device Group possesses the Device Keys of all the other devices in the Device Group, except for its own Device Key. As shown in FIG. 1, table 100 lists the keys that each device possesses. For example, Device 1 includes the Device Group Key and Device Key 2 through Device Key N. Key-management procedures exist for large groups, such that each device only has to be issued fewer keys than the group size minus one and can compute from these keys all keys that are required.

When the broadcaster of a message wants to securely send a message to addresses of a subset of devices from the Device Group, the broadcaster puts the IDs of the addressed devices as a plaintext part of the message and computes an encryption key that is a function of all the Device Keys of the NON-addressed devices. The Device Keys of the NON-addressed devices are used because the addressed devices do not have their own keys. The broadcaster encrypts and broadcasts the message. Devices in the Device Group that are not addressed cannot decrypt the message, because they need their own key which they do not have. Devices outside the Device Group cannot decrypt the message because they do not have the keys of the non-addressed devices. Only addressed devices in the Device Group can decrypt the message. Of course, Devices belonging to the Device Group will have to know the algorithm to compute the message key from the Device Keys. In general, that algorithm does not have to be kept secret from others outside the Device Group.

A related concept is k-resiliency. In "Broadcast Encryption," Krishnaram Kenthapadi, Nov. 11, 2003, the author defines k-resiliency as follows:

In a system consisting of a set U of n users, a broadcast scheme is resilient to a set of users S if for every subset T, that is disjoint from S, no eavesdropper that has all the secrets of S can obtain "knowledge" about the secret common to T. We could either consider the information-theoretic or the computational definition of security. The scheme is k-resilient if it is resilient to any set S U of size k.

Another way of defining k-resiliency is that a broadcast scheme is k-resilient if at least k+1 members have to collude (work together) in order to obtain all group secrets. Such an attack of combining the knowledge by a group is referred to as a collusion attack.

The scheme described above is 1-resilient. That is simple to see with the above definition, since any group member can learn the secret it is missing, its own key, from any other group member.

Examples of existing k-resilient broadcast encryption schemes may be found in Amos Fiat and Moni Naor, *Broadcast Encryption,* 1993 and Krishnaram Kenthapadi, *Broadcast Encryption,* Nov. 11, 2003.

When adding a member to a Device Group, all old members usually are issued new group keys or perform a one-way function on the old group keys and the new member is issued the new keys. Note that a one-way function is a mathematical function that is easy to compute for every input, but for which the inverse function is very hard to compute. By doing so, the new member cannot decrypt old messages sent to the group. This may or may not be a requirement in a practical implementation.

Sending a message to all Devices in a Device Group

If a broadcaster outside the Device Group needs to broadcast a message to all devices in the Device Group, it has a problem with the simple scheme described above, because there is no unaddressed device, so the broadcaster does not have a key to use. A solution here is to use a special Device Group Key that all devices know. One could say that this Device Group Key is the Device Key of a device that does not and will never exist. Similar solutions exist for k-resilient schemes.

If a member of a Device Group wants to send a message to all other devices in the Device Group, it has the same problem. Therefore, in addition to the Device Keys of all other devices in the Device Group, each device also gets a Device Group Key (see FIG. 1). Thus, to send a message to all members of the Device Group, the broadcaster would use the Device Group Key.

The above-described broadcast encryption schemes rely on a central authority to distribute the keys required by each device and manage membership of the group.

Advantageously, certain embodiments herein provide a scheme where such a central authority is not required and the group devices themselves can manage Device Group set-up and management, and further manage the keys required by each device.

Additionally, certain embodiments herein provide a scheme where any member of a Device Group can securely send messages to all other members of the Device Group or any sub-set thereof without any non-addressed member or any outsider being able to decrypt these messages.

Another advantageous embodiment provides a scheme by which a device that is not a member of a Device Group can become a member by communicating only with some members of the Device Group, for example, k+1 members for a k-resilient broadcast encryption scheme.

Further advantageous embodiments provide schemes by which a device group membership can be taken away from a device by the other members of the Device Group.

In one embodiment, the invention relates to a method of adding a new device to a device group, the device group comprising a plurality of devices, wherein each device in the device group possesses a device group key and device keys of other devices in the device group for encryption of messages, except for its own device key, the method comprising: establishing a secure connection between the new device and a first device in the device group; sending, by the first device in the device group, the device group key and device keys of the other devices in the device group to the new device via the secure connection; distributing, by one of the other devices in the device group, the device key of the first device in the device group to the new device; generating, by one of the devices in the device group, a device key of the new device and distributing the device key of the new device to all other devices in the device group, except for the new device.

In another embodiment, the invention relates to a method of removing a device from a device group, the device group comprising a plurality of devices, wherein each device in the device group possesses a device group key and device keys of other devices in the device group for encryption of messages, except for its own device key, the method comprising: generating and distributing, by a first device remaining in the device group, a new device key for each of the other devices remaining in the device group, such that each of the other devices does not receive its own new device key; generating, by one of the other devices remaining in the device group, a new device key of the first device remaining in the device group and distributing to all other devices remaining in the device group; and generating, by one of the devices remaining in the device group, a new device group key and distributing to all other devices remaining in the device group.

In general the various aspects of the invention may be combined and coupled in any way possible within the scope of the invention. The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

The following description of an embodiment of the invention is for a 1-resilient scheme.

1. Establishment of Device Keys and Device Group Key when Adding a Device to a Device Group.

Figures 1, 2:
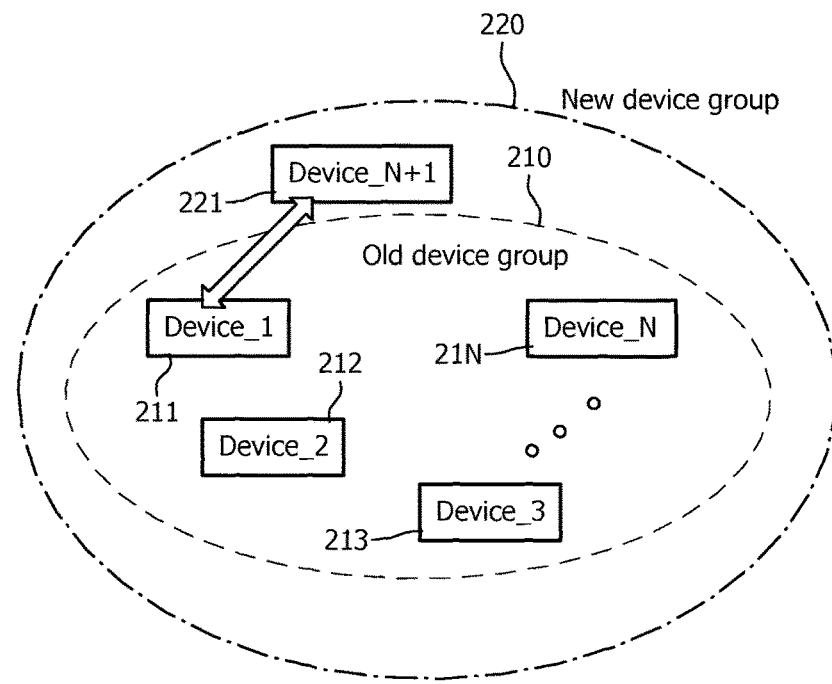
FIG. 1 shows a table with keys that each device in the device group possesses.
FIG. 2 shows an illustration of a new device group that is formed after a new device joins an old device group.

Referring to FIG. 2, an old device group 210 includes member devices: Device_1 211, Device_2 212, Device_3 213 . . . Device_N 21N. When a new device Device_N+1 221 joins the device group, a new device group 220 is formed. For clarity, the original group of N devices is labeled the Old Device Group 210 and the expanded group is labeled the New Device Group 220. It is understood that each device in the device group includes at least a network interface for communicating with other devices, and a processing unit having hardware and software components for performing encryption, decryption of messages and processing as outlined below.

As shown in FIG. 2, there are multiple devices Device_1 211, Device_2 212, Device_3 213 . . . Device_N 21N in the old device group 210. For this general case of a Device Group of size N>1, each of the 2 . . . N devices possesses the Device Keys of the other N−1 devices and the Device Group Key, but not its own Device Key, as, for example, shown in table 100 of FIG. 1.

However, a special case occurs when the old device group 210 consists of only 1 device, as compared to the starting case where the old device group 210 consists of more than 1 device shown in FIG. 2.

For the special case of N=1, i.e., the Old Device Group 210 consists of one device, because a device must not know its own Device Key and because there are no other devices to maintain the device's own Device Key, there is no Device Key within this special case scheme. Prior to the new device Device_N+1 221 joining the group, the single device generates, preferably, a random Device Group Key. Following the generation of the random Device Group Key the procedures for adding device Device_N+1 221 to the group are similar to the general case of N>1. Therefore, the discussion continues with reference to FIG. 3.

Figure 3:
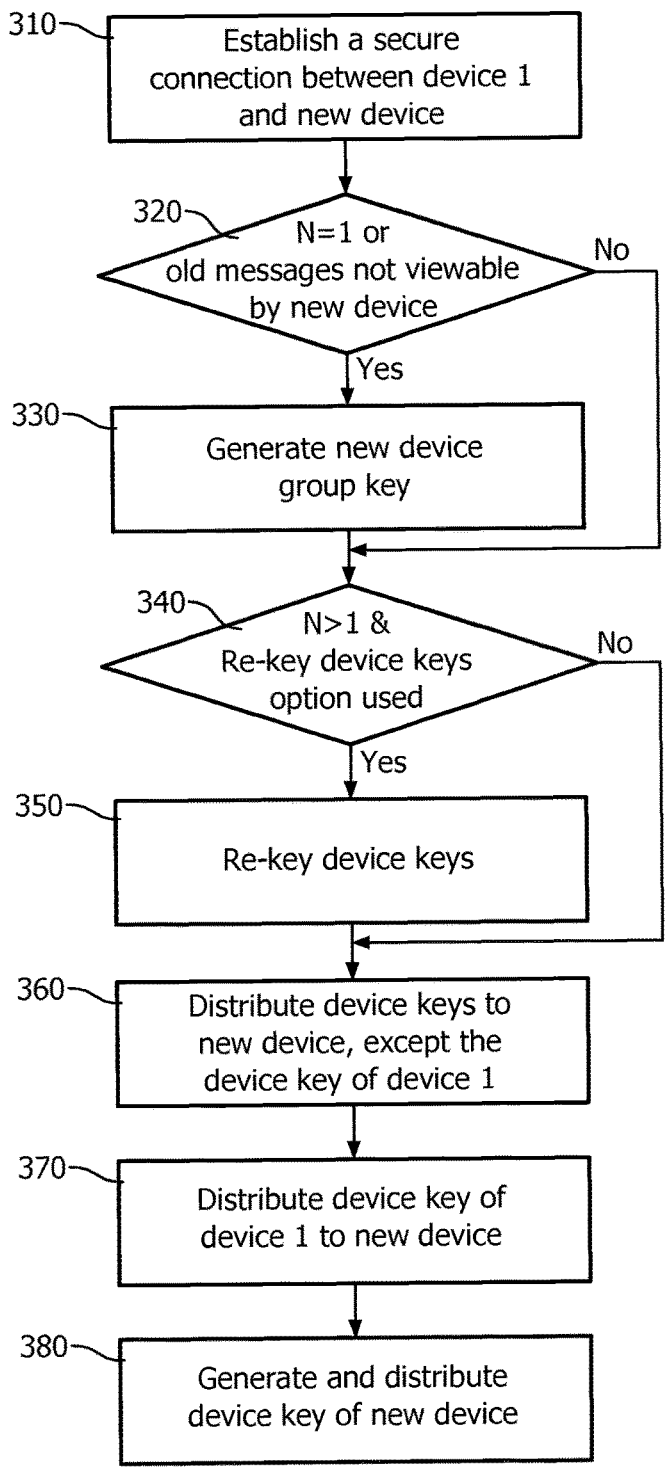
FIG. 3 shows a flow chart of device key management when a device joins a device group.

FIG. 3 shows the process flow of adding a new device to the device group for both the general case of N>1 and the special case of N=1. While blocks appear in a particular order, it is not a requirement to perform steps in the particular order shown.

This embodiment has 2 options as shown in FIG. 3,
generate a new Device Group Key in 330, and
generate new Device Keys in 350.

If the special case applies where N=1, then a new Device Group Key is generated as pointed out above. Where N>1, if it is a requirement that the new device (Device_N+1) 221 must not be able to decrypt messages previously exchanged between members of the Old Device Group 210, the new device (Device_N+1) 221 does not learn the old keys, so all keys need to be generated anew, and both options must be used.

If at least one of these options is used, the distribution in 380 of the Device Key of the new device (Device_N+1) 221 does not require the setting-up of extra secure channels.

In 310, a secure connection between Device_1 211 and the new device Device_N+1 221 is established. The secure connection may be, for example, a secure pairing using Near Field Communication (NFC), using a secure simple pairing of Bluetooth, or Wi-Fi Protected Setup of a Wi-Fi ad-hoc or Wi-Fi Direct connection, or any other appropriate secure pairing. In one embodiment the new device_N+1 221 is 'securely paired' with Device_1 211 from the Old Device Group 210, where 'securely paired' means here that the connected devices are authenticated as paired and no other device can decrypt the messages being exchanged between the paired devices.

In 320, if N=1, the special case, or it is a requirement that the new device (Device_N+1) 221 must not be able to decrypt messages previously exchanged between members of the Old Device Group 210, then move to 330 and generate a new Device Group Key.

As mentioned above for the special case where N=1, i.e. the Old Device Group 210 consists of one device, the single device generates, preferably, a random Device Group Key.

For N>1, to generate the new Device Group Key Device_1 211, Device_2 212, Device_3 213, . . . , Device_N 21N use a one-way function on the Device Group Key of the Old Device Group 210 to create the Device Group Key of the New Device Group 220. The particular one-way function must be known, but does not have to be a secret. Note that not creating a new Device Group Key would mean that the new device 221 can subsequently decrypt the messages by which its Device Key is distributed to Device_2 212, Device_3 213 . . . Device_N 21N in step 360, if that message was encrypted with the old Device Group Key.

At 340, if N>1 and it is a requirement that the new device (Device_N+1) 221 must not be able to decrypt messages previously exchanged between members of the Old Device Group 210, then move to 350 and generate new Device Keys. In other words, the devices of the Old Device Group 210 are re-keyed.

At 350, Device_1 211, Device_2 212, Device_3 213 . . . Device_N 21N perform a re-keying action of the Device Keys they possess. The re-keying action can use the same one-way function as the one used in step 330, or a different method. The process at 350 is optional depending on the specific implementation, for example, if it is a requirement that the new device (Device_N+1) 221 is unable to decrypt messages previously exchanged between members of the Old Device Group 210.

In 360, keys are distributed to the new device, except the Device Key of Device_1 211. Device_1 211 sends the Device Group Key of the New Device Group 220 to the new device 221 over the secure channel. This is performed for both N=1 and N>1.

For N>1, Device_1 211 sends the IDs and (possibly re-keyed) Device Keys of Device_2 212, Device_3 213 . . . Device_N 21N over the private secure channel to the new device 221. This is not required for N=1. Not all of these IDs and Device Keys are sent by Device_1 211 over the private secure channel. Any combination of one or more Device Keys sent over the private secure channel can be used to encrypt the remaining Device Keys for sending them securely to the new device 221 over another channel, rather than the private secure one. This may be advantageous if it is costly to send information over the private secure channel. The private secure channel may have, for example, a low bit-rate or the encryption it requires may take much CPU time.

In 370, the Device Key of Device_1 211 is distributed to the new device 221.

The new device 221 still has to learn the Device Key of Device_1 211. However, Device_1 211 cannot perform this step because it does not know its own Device Key.

In case N=1, the new device 221 simply generates a random number and starts using that as the Device Key of Device_1 211.

For N>1, the new device 221 makes a secure connection to any of the other devices (Device_2 212, Device_3 213 . . . Device_N 21N), but not using the keys it learned so far, because this new connection must be such that Device_1 211 cannot decrypt the messages in order to obtain its own key. This secure connection may be of the same type as the new device 221 has used for its first secure connection with Device_1 211 in 310.

The device that the new device 221 is now securely communicating with sends the (possibly re-keyed) Device Key of Device_1 211 to the new device 221. Preferably, a device authentication should be required to ensure that it is the new device 221 making the secure connection with any of the other devices and not Device_1 211 to ensure Device_1 211 does not obtain its own key. Any authentication method can be used.

The new device 221 can approach any of the devices (Device_2 212, Device_3 213 . . . Device_N 21N) through the secure channel it has set-up with Device_1 211 for asking the Device Key of Device_1 211. Through this channel, the new device 221 can set-up a secure channel with any of the devices (Device_2 212, Device_3 213 . . . Device_N 21N). However, this approach would require additional authentication for distinguishing that it is the new device 221 setting up this new secure channel and not Device_1 211.

In 380, the Device Key of the new device 221 is generated and distributed.

Any one of the devices in the old device group can perform this function. Without loss of generality, assuming that Device_1 211 performs this step, Device_1 211 generates a random number that is going to be the Device Key of the new device 221. Device_1 211 sends information on the new device 221 (e.g. ID, name, etc.) together with the Device Key of the new device to all members of the Old Device Group 210 (not required for N=1). This means that all devices of the New Device Group 220, except the new device 221 itself, possess the key of the new device 221.

To transmit this information Device_1 211 preferably encrypts the information in order that new device 221 does not learn its own key. In one embodiment the key that Device_1 211 uses for the encryption of this transmission is the Device Group Key of the Old Device Group 210. In this case, a new Device Group Key has to be generated in 320. If the Device Keys are re-keyed in 330 of FIG. 3, the Device Keys of the Old Device Group 210 can also be used for the encryption of this transmission. In the latter case, the transmission is sent to at least two sub-groups of the Old Device Group 210, because Device_1 211 needs its own Device Key, which it does not have, to send an encrypted message to devices 2 . . . N in one transmission.

If optional acts 320 and 330 are not taken, so none of the Device Group Key and Device Keys are generated anew, Device_1 211 needs to set-up other secure ways to communicate the Device Key of the new device (Device_N+1) 221 to the other devices in the Old Device Group 210.

Note that in 330 and 350 as described above, the re-keying uses a one-way function. This has as advantage that the new keys do not have to be distributed. However, it is also possible that the new keys (Device Group Key and/or Device Keys) are generated randomly and distributed securely over the devices of the Old Device Group 210 using the old keys. A similar way to generate new keys randomly and to distribute them securely over the devices of the Old Device Group 210 is used below in 520 and 530.

Figure 4:
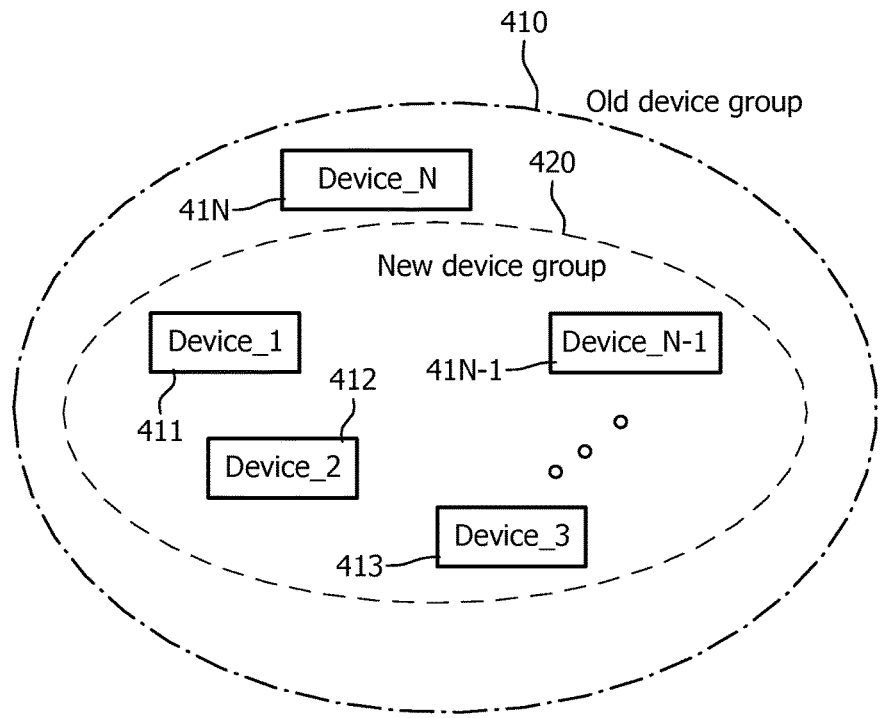
FIG. 4 shows an illustration of a new device group that is formed after a device leaves its old device group.

2. Establishment of Device Keys and Device Group Key when Removing a Device from a Device Group Referring to FIG. 4, a Device Group 410 of N devices (Device_1 411, Device_2 412, Device_3 413 . . . Device_N 41N) with N>1 is shown, where Device_N is to be removed from the Old Device Group. The devices remaining in the Old Device Group 410 form a new Device Group 420. Examples of why a device is to be removed include a device that is broken, has been sold or given away, etc.

Figure 5:
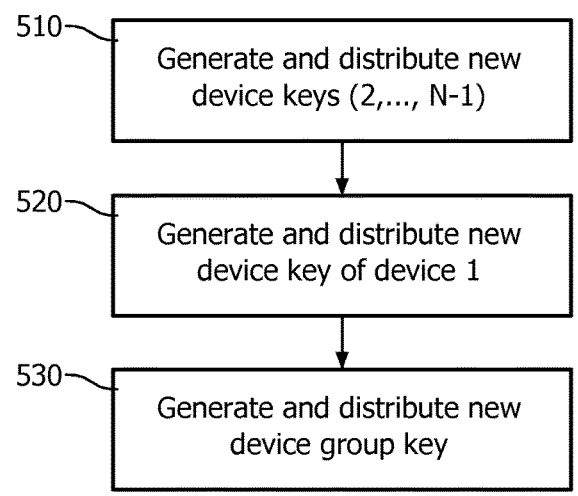
FIG. 5 shows a flow chart of device key management when a device leaves a device group.

FIG. 5 shows the high level process flow of removing a device from the device group. While blocks appear in a particular order, it is not a requirement to perform steps in the particular order shown.

Any one of the remaining devices may be used for starting this process. Without loss of generality, assume that Device_1 411 is used.

In 510, new Device Keys for Devices_2 412, Devices_3 413 . . . Device_N−1 41N−1 are generated and distributed.

To generate and distribute the new Device Keys, Device_1 411 randomly generates new Device Keys for Devices_2 412, Devices_3 413 . . . Device_N−1 41N−1. Note that the new keys must not be generated using the known one-way function, because the Device_N to be removed could also generate the new keys the same way.

Device_1 411 sends the new keys to Devices_2 412, Devices_3 413 . . . Device_N−1 41N−1, in such a way that each of the Devices_2 412, Devices_3 413 . . . Device_N−1 41N−1 does not receive its own new Device Key. The new Device Keys are encrypted prior to sending by using the Device Key of the to-be-removed Device_N 41N, because this device does not have its own key.

In 520, new Device Key of Device_1 411 is generated and distributed.

To generate and distribute the new Device Key of Device_1 411, any one of the other devices remaining in the New Device Group 420 (Devices_2 412, Devices_3 413 . . . Device_N−1 41N−1) randomly generates a new Device Key of Device_1 411. The device sends this new device key to the other devices using the old Device Keys of Device_1 411 and Device_N 41N, so that Device_1 411 does not learn about its new Device Key, and the removed device Device_N 41N also does not learn about the new Device Key of Device_1 411.

In 530, a new Device Group Key is generated and distributed.

To generate and distribute the new Device Group Key, any one of the remaining devices may be used for performing this action. Without loss of generality, assuming Device_1 411 performs this action, Device_1 411 randomly generates a new Device Group Key and sends the new Device Group Key to Devices_2 412, Devices_3 413 . . . Device_N−1 41N−1 using the Device Key of the to-be-removed Device_N 41N. As already noted above, Device_1 411 does not generate the new Device Group Key, because the device to be removed can also generate the new Device Group Key the same way.

An alternative approach is to base the key for all future communication on at least the key of the device to be removed. Thus, the key for future communication would include at least the key of any device to be removed. Alternatively, just the last removed device can be utilized. One skilled in the art can recognize variations in generating the keys based on removed devices.

In the above embodiments, the devices create keys for encryption of messages. However, the same methods can be used for generating the keys for authenticating messages. The same method can also be used for the generation of so-called key material from which encryption keys and/or authentication or other keys are derived.

K-Resiliency

The approach described in the above embodiments may also be applied for k-resilient schemes. For a k-resilient scheme, adding a member involves setting up a secure connection with k+1 devices in order to receive enough information on the group secrets. In setting up the secure connection and communicating, each of the original Device Group devices ensures that it is communicating with the new device and not with a device that is already a member of the group, because then that member of the group would have access to all secrets. Thus, in a preferred embodiment device authentication is included.

When removing a member, k devices generate new group secrets and send this to the N−k−1 other devices using the proper old Device Group keys.

Figure 6:
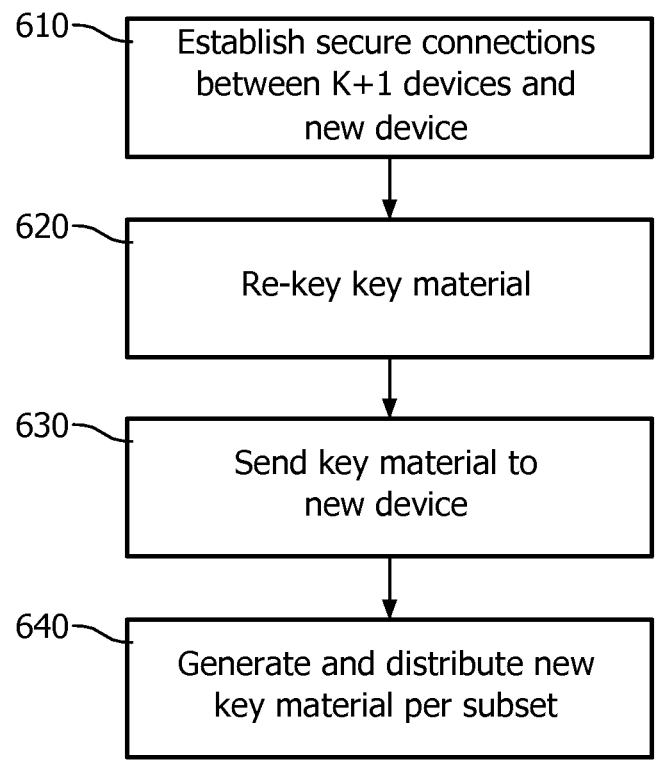
FIG. 6 shows a flow chart of device key management when a device joins a device group under a k-resilient scheme.

FIG. 6 shows a high level process flow of adding a device to a device group under a k-resilient scheme. Under such a scheme, each device in the device group possesses key material with which it can encrypt messages to the whole device group or to any subset of the device group, such that only addressed devices can decrypt the messages.

In this case, subsets in the device group that have at most k−1 members are extended with the new device to extended subsets of at most k member devices.

In 610, k+1 secure connections are established between a new device and k+1 devices in the device group.

In 620, each device in the device group re-keys the key material with a one-way function.

In 630, the k+1 devices send the re-keyed material to the new device via the k+1 secure connections.

In 640, k devices in the group generate—for all subsets in the device group that have at most k−1 members and that do not include the generating device itself extended with the new device, so for subsets of at most k member devices—new key material per subset to encrypt messages that can be decrypted by all devices in the subset of the device group and by the new device. The k devices distribute the key material per subset to all devices in the device group that are not part of the extended subset of the device group.

Figure 7:
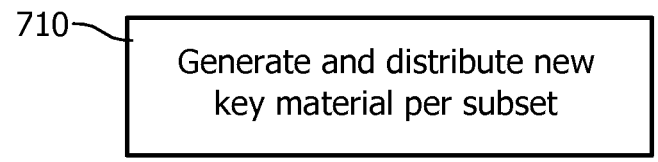
FIG. 7 shows a flow chart of device key management when a device leaves a device group under a k-resilient scheme.

When removing a device from the device group under a k-resilient scheme, k+1 of the remaining devices in the device group generate—for all subsets of the device group that have at most k members and that do not include the generating device itself, nor the device to be removed from the device group—new key material per subset to encrypt messages that can be decrypted by all devices in the subset of the device group and distribute the key material per subset to all devices in the device group that are not part of the subset of the device group. FIG. 7 shows the step 710 to remove a device.

The k-resilient scheme will be further clarified for the special case of k=2 and when a fifth device is added and later removed from a group of 4 devices. A 2-resilient scheme means that the information of any single non-addressed device, as well as the combined information of any two non-addressed devices, is sufficient to compute the key that is used to encrypt messages to the addressed devices.

Adding a Device (k=2)

In the starting situation, there are 4 devices D1, D2, D3 and D4. Each of these devices has keys for all subsets of 1 and 2 devices of which subset it is not a member. See Table 1 for the keys each device has.

TABLE 1

| Device | Keys known to the device |
|---|---|
| D1 | K0, K2, K3, K4, K23, K24, K34 |
| D2 | K0, K1, K3, K4, K13, K14, K34 |
| D3 | K0, K1, K2, K4, K12, K14, K24 |
| D4 | K0, K1, K2, K3, K12, K13, K23 |

In Table 1, K0 is the device group key, K2 is the key for the subset consisting of only device D2, and K23 is the key for the subset consisting of devices D2 and D3.

When addressing a message to a subset, the key to be used is a function of the keys of all the subsets of size 2 that are not addressed. For example, when only device D1 is addressed by device D4, the key to be used is a function of K23, the key that both D2 and D3 do not have. In case there is only one device not addressed, the key to be used is the key of the non-addressed device.

When a device D5 is added, the following steps are taken. To further aid the understanding of this process, flow diagram in FIG. 6 is followed with the special case where k=2.

In 610, 2+1=3 secure connections are established between D5 and three devices in the device group. In this example and without loss of generality, the three devices are assumed to be D1, D2 and D3.

In 620, each device in the device group re-keys the key material with a one-way function. The re-keyed keys are denoted here with an apostrophe (').

In 630, devices D1, D2 and D3 send the re-keyed material they have, i.e. K0', K1', K2', K3', K4', K12' K13', K14', K23', K24', K34' to the new device D5.

Table 2 shows the keys that all devices contain at this point of the device addition procedure.

TABLE 2

| Device | Keys known to the device |
|---|---|
| D1 | K0, K2, K3, K4, K23, K24, K34 |
|  | K0', K2', K3', K4', K23', K24', K34' |
| D2 | K0, K1, K3, K4, K13, K14, K34 |
|  | K0', K1', K3', K4', K13', K14', K34' |
| D3 | K0, K1, K2, K4, K12, K14, K24 |
|  | K0', K1', K2', K4', K12', K14', K24' |
| D4 | K0, K1, K2, K3, K12, K13, K23 |
|  | K0', K1', K2', K3', K12', K13', K23' |
| D5 | K0', K1', K2', K3', K4', K12', K13', K14', K23', K24', K34' |

In 640, devices D1 and D2 in the device group, or possibly another set of k devices in the device group, generate for all subsets in the new device group that have at most 2 members and that do not include the generating device but do include the new device D5, new key material per subset to encrypt messages that can be decrypted by all devices in the subset of the device group and by the new device, and distribute the key material per subset to all devices in the device group that are not part of the subset of the device group.

This means that D1 generates K5', K25', K35' and K45'. Device D1 distributes K5' to D2, D3 and D4, using the old device group key K0 that the new device D5 does not know. Device D1 distributes K25' to D3 and D4, using the old device key K2, so both D2 and the new device D5 are unable to learn K25'. Keys K35' and K45' are similarly distributed by device D1. It is also possible for device D1 to send to each device separately the new keys it needs using the appropriate encryption keys, e.g., D1 could send device D2 the keys K5', K35' and K45' using key K34 as an encryption key. Devices D3, D4 and D5 do not have this key. In a similar way, the new keys for D3 and D4 can be distributed by D1.

Table 3 shows the keys that all devices contain at this point of the device addition procedure.

TABLE 3

| Device | Keys known to the device |
|---|---|
| D1 | K0, K2, K3, K4, K23, K24, K34 |
|  | K0', K2', K3', K4', K5', K23', K24', K25', K34', K35', K45' |
| D2 | K0, K1, K3, K4, K13, K14, K34 |
|  | K0', K1', K3', K4', K5', K13', K14', K34', K35', K45' |
| D3 | K0, K1, K2, K4, K12, K14, K24 |
|  | K0', K1', K2', K4', K5' K12', K14', K24', K25', K45' |
| D4 | K0, K1, K2, K3, K12, K13, K23 |
|  | K0', K1', K2', K3', K5', K12', K13', K23', K25', K35' |
| D5 | K0', K1', K2', K3', K4', K12', K13', K14', K23', K24', K34' |

In the last step, device D2 generates K15', the key of the only missing subset and distributes to devices D3 and D4. Device D2 uses key K1 for this, so both D1 and the new device D5 are not able to learn K15'.

Device D2 could also have generated keys K5', K35' and K45' instead of device D1. Some scheme is required so that both devices agree on the division of work.

Table 4 shows the keys that all devices contain at the end of the device addition procedure.

TABLE 4

| Device | Keys known to the device |
|---|---|
| D1 | K0, K2, K3, K4, K23, K24, K34 |
|  | K0', K2', K3', K4', K5', K23', K24', K25', K34', K35', K45' |
| D2 | K0, K1, K3, K4, K13, K14, K34 |
|  | K0', K1', K3', K4', K5', K13', K14', K15', K34', K35', K45' |
| D3 | K0, K1, K2, K4, K12, K14, K24 |
|  | K0', K1', K2', K4', K5' K12', K14', K15', K24', K25', K45' |
| D4 | K0, K1, K2, K3, K12, K13, K23 |
|  | K0', K1', K2', K3', K5', K12', K13', K15', K23', K25', K35' |
| D5 | K0', K1', K2', K3', K4', K12', K13', K14', K23', K24', K34' |

Removing a Device (k=2)

Removing a device will be shown in the special case of a 2-resilient scheme. The starting situation is the (expanded) group of 5 devices from the previous example. When removing a device from the device group under a 2-resilient scheme, 2+1=3 of the remaining devices in the device group generate, for all subsets of the device group that have at most 2 members and that do not include the generating device itself, nor the device to be removed from the device group, new key material per subset to encrypt messages that can be decrypted by all devices in the subset of the device group and distribute the key material per subset to all devices in the device group that are not part of the subset of the device group. In this example, D5 is the device to be removed. Without loss of generality, it is assumed here that devices D1, D2, and D3 perform the device removal step 710.

D1 generates keys K0", K2", K3", K4", K23", K24", and K34".

Device D1 distributes K0", K3", K4", and K34" to D2 using a key that is a function of keys K34', K35' and K45', so devices D3, D4 and D5 are not able to learn these new keys.

Device D1 distributes K0", K2", K4", and K24" to D3 using a key that is a function of keys K24', K25' and K45', so devices D2, D4 and D5 are unable to learn these new keys.

Device D1 distributes K0", K2", K3", and K23" to D4 using a key that is a function of keys K23', K25' and K35', so devices D2, D3 and D5 are unable to learn these new keys.

Table 5 shows the keys that all devices contain at this point of the device removal procedure. For clarity, the initial keys, i.e., the ones without an apostrophe (') or right quotation (") have been removed from this table.

TABLE 5

| Device | Keys known to the device |
|---|---|
| D1 | K0', K2', K3', K4', K5', K23', K24', K25', K34', K35', K45' |
|  | K0", K2", K3", K4", K23", K24", K34" |
| D2 | K0', K1', K3', K4', K5', K13', K14', K15', K34', K35', K45' |
|  | K0", K3", K4", K34" |
| D3 | K0', K1', K2', K4', K5' K12', K14', K15', K24', K25', K45' |
|  | K0", K2", K4", K24" |
| D4 | K0', K1', K2', K3', K5', K12', K13', K15', K23', K25', K35' |
|  | K0", K2", K3", K23" |
| D5 | K0', K1', K2', K3', K4', K12', K13', K14', K23', K24', K34' |

D2 then generates keys K1", K13", and K14".

Device D2 distributes K1" and K14" to D3 using a key that is a function of keys K14', K15' and K45', so devices D1, D4 and D5 are unable to learn these new keys.

Device D2 distributes K1" and K13" to D4 using a key that is a function of keys K13', K15', and K35', so devices D1, D3 and D5 are unable to learn these new keys.

Table 6 shows the keys that all devices contain at this point of the device removal procedure.

TABLE 6

| Device | Keys known to the device |
|---|---|
| D1 | K0', K2', K3', K4', K5', K23', K24', K25', K34', K35', K45' K0", K2", K3", K4", K23", K24", K34" |
| D2 | K0', K1', K3', K4', K5', K13', K14', K15', K34', K35', K45' K0", K1", K3", K4", K13", K14", K34" |
| D3 | K0', K1', K2', K4', K5' K12', K14', K15', K24', K25', K45' K0", K1", K2", K4", K14", K24" |
| D4 | K0', K1', K2', K3', K5', K12', K13', K15', K23', K25', K35' K0", K1", K2", K3", K13", K23" |
| D5 | K0', K1', K2', K3', K4', K12', K13', K14', K23', K24', K34' |

Lastly, D3 generates key K12" and distributes this key to D4 using a key that is a function of keys K11', K15', and K25', so devices D1, D2, and D5 are unable to learn this new key.

Table 7 shows the keys that all devices contain at the end of the device removal procedure.

TABLE 7

| Device | Keys known to the device |
|---|---|
| D1 | K0', K2', K3', K4', K5', K23', K24', K25', K34', K35', K45' K0", K2", K3", K4", K23", K24", K34" |
| D2 | K0', K1', K3', K4', K5', K13', K14', K15', K34', K35', K45' K0", K1", K3", K4", K13", K14", K34" |
| D3 | K0', K1', K2', K4', K5' K12', K14', K15', K24', K25', K45' K0", K1", K2", K4", K12", K14", K24" |
| D4 | K0', K1', K2', K3', K5', K12', K13', K15', K23', K25', K35' K0", K1", K2", K3", K12", K13", K23" |
| D5 | K0', K1', K2', K3', K4', K12', K13', K14', K23', K24', K34' |

As can be seen in the above examples, the number of keys required for k-resilient schemes grows quickly with k and the total number of devices. There are ways to reduce the number of keys, (see, for example, Amos Fiat and Moni Naor, *Broadcast Encryption*, 1993), and these ways may be combined with the present invention to simplify the implementation of some embodiments.

This invention is applicable to devices, such as TVs, PC monitors, (digital, home) audio systems, access points, dedicated wireless docking stations, PCs.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as any combination of hardware, firmware and software. Moreover, the software is preferably implemented as an application program tangibly embodied on a program storage unit or computer readable storage medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The invention claimed is:

1. A method of adding a new device to a device group comprising a plurality of devices, the method comprising:
    establishing a secure connection between the new device and a first device in the device group;
    sending, from the first device in the device group to the new device, a device group key to encrypt or decrypt messages sent or received to or from the device group;
    sending, from the first device in the device group to the new device, device keys of all other devices in the device group to encrypt or decrypt messages sent or received to or from a respective device in the device group;
    sending, from one of the other devices in the device group to the new device, the device key of the first device to encrypt or decrypt messages sent or received to or from the first device;
    encrypting, by the first device using the device group key, a device key associated with the new device to encrypt or decrypt messages sent or received to or from the new device; and
    generating and distributing, from the first device to all other devices in the device group except to the new device, the device key associated with the new device.

2. The method according to claim 1, further comprising generating, by all the devices in the device group, a new device group key to encrypt or decrypt messages sent or received to or from the device group.

3. The method according to claim 1, further comprising for each device in the device group, re-keying all device keys contained in each device.

4. The method according to claim 2, wherein the generating of the new device group key further comprises performing a one-way function on the device group key.

5. The method according to claim 3, wherein the re-keying further comprises performing a one-way function on the device keys.

6. A method of managing a membership of a device group, the device group comprising a plurality of devices, the method comprising:
    when adding a new device to the device group:
        establishing a secure connection between the new device and a first device in the device group;
        sending, from the first device in the device group to the new device, a device group key to encrypt or decrypt messages sent or received to or from the device group;
        sending, from the first device in the device group to the new device, device keys of all other devices in the device group to encrypt or decrypt messages sent or received to or from a respective device in the device group;
        sending, from one of the other devices in the device group to the new device, the device key of the first device to encrypt or decrypt messages sent or received to or from the first device in the device group;

encrypting, by the first device using the device group key, a device key associated with the new device to encrypt or decrypt messages sent or received to or from the new device; and generating and distributing, from the first device to all other devices in the device group except to the new device, the device key associated with the new device;

when removing a device from the device group:

generating and distributing, by a first device remaining in the device group, new device keys to encrypt or decrypt messages sent or received to or from a respective device remaining in the device group, such that each remaining device only receives new device keys belonging to other remaining devices in the group;

generating and distributing, from one of the other remaining devices in the device group to all other remaining devices in the device group except to the first device, a new device key of the first device remaining in the device group to encrypt or decrypt messages sent or received to or from the first device remaining in the device group; and generating and distributing, by one of the other devices remaining in the device group, a new device group key to all other devices remaining in the device group.

7. The method according to claim 6, further comprising:
when adding a new device to the device group, generating a new device group key by all the devices in the device group by performing a one-way function on the device group key; and
when removing a device from the device group, generating the new device group key randomly.

8. The method according to claim 6, further comprising:
when adding a new device to the device group, for each device in the device group, re-keying all device keys contained by each device; and
when removing a device from the device group, generating the new device keys randomly.

9. The method according to claim 6, wherein:
when removing a device from the device group, the new device key of the first device remaining in the device group is distributed after having been encrypted with an old device key of the first device and the device key of the device being removed.

10. The method according to claim 6, wherein:
when removing a device from the device group, each of the new device keys for each of the other devices remaining in the device group are distributed after having been encrypted with the device key of the device being removed from the device group and with an old device key.

11. The method according to claim 6, wherein:
when removing a device from the device group, the new device group key is distributed after having been encrypted with the device key of the device being removed from the device group.

12. A method of managing a membership of a device group, the device group comprising multiple devices, wherein each device in the device group possesses key material for encrypting messages to the device group or to a subset of the device group, the method comprising:

when adding a new device to the subset of the device group:
establishing secure connections between the new device and the devices in the device group;
sending, by the devices in the device group, the key material to the new device;
generating, by the devices in the device group, new key material to encrypt messages that are to be decrypted by all devices in said subset of the device group and by the new device being added to the subset; and
distributing re-keyed material to the devices in the device group except the subset of the device group; and when removing a device from the subset of the device group:
generating, by the devices remaining in the device group, new key material to encrypt messages that are to be decrypted by all devices in each subset of the device group that does not include the device to be removed; and
distributing said key material to all devices in each subset of the device group that does not include the device to be removed.

13. The method according to claim 12, further comprising when adding a new device to the device group, each device in the device group, rekeying said key material with a one-way function.

* * * * *